United States Patent
Tsujiuchi et al.

(10) Patent No.: US 8,906,141 B2
(45) Date of Patent: Dec. 9, 2014

(54) CARBON DIOXIDE RECOVERY APPARATUS AND METHOD

(75) Inventors: Tatsuya Tsujiuchi, New York, NY (US); Shintaro Honjo, New York, NY (US); Takahito Yonekawa, New York, NY (US); Satoru Sugita, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 141 days.

(21) Appl. No.: 13/570,983

(22) Filed: Aug. 9, 2012

(65) Prior Publication Data

US 2014/0042363 A1    Feb. 13, 2014

(51) Int. Cl.
*B01D 53/14*    (2006.01)

(52) U.S. Cl.
USPC .......... 95/183; 95/193; 95/194; 95/199; 95/209; 95/223; 95/227; 95/228; 95/236; 96/242

(58) Field of Classification Search
CPC combination set(s) only.
See application file for complete search history.

(56) References Cited

U.S. PATENT DOCUMENTS

| | | | |
|---|---|---|---|
| 5,783,047 A | 7/1998 | Aso et al. | |
| 6,536,234 B1 * | 3/2003 | Shah | 62/646 |
| 2002/0134243 A1 | 9/2002 | Granier | |
| 2008/0056972 A1 * | 3/2008 | Iijima | 423/220 |

FOREIGN PATENT DOCUMENTS

| | | | | |
|---|---|---|---|---|
| JP | 56-33024 A | 4/1981 | | |
| JP | 5-285339 A | 11/1993 | | |
| JP | 7-103685 A | 4/1995 | | |
| JP | 8-66601 A | 3/1996 | | |
| JP | 08066601 A | * | 3/1996 | B01D 3/28 |
| JP | 8-131704 A | 5/1996 | | |
| JP | 9-52001 A | 2/1997 | | |
| JP | 9-85039 A | 3/1997 | | |
| JP | 11-179101 A | 7/1999 | | |
| JP | 11-179102 A | 7/1999 | | |
| JP | 11-179103 A | 7/1999 | | |
| JP | 2000-189703 A | 7/2000 | | |
| JP | 2000-189704 A | 7/2000 | | |
| JP | 2000-189705 A | 7/2000 | | |
| JP | 2000-229202 A | 8/2000 | | |

(Continued)

OTHER PUBLICATIONS

International Search Report dated Sep. 10, 2013, issued in corresponding International Application No. PCT/JP2013/068846 (3 pages).

*Primary Examiner* — Duane Smith
*Assistant Examiner* — Cabrena Holecek
(74) *Attorney, Agent, or Firm* — Westerman, Hattori, Daniels & Adrian, LLP (57) ABSTRACT

An apparatus for separating and recovering $CO_2$ from a $CO_2$ absorbent, includes: a regeneration tower for regenerating the absorbent that has absorbed $CO_2$ by heating it to separate and remove $CO_2$ therefrom and to exhaust $CO_2$ gas; a compressor for compressing the $CO_2$ gas exhausted from the tower; and a heat exchanger for heating the absorbent in the tower by exchanging heat with a part of the compressed $CO_2$ by the compressor which is introduced into the tower. The apparatus may include a plurality of the compressors and a plurality of the heat exchangers. The plurality of compressors is arranged in series to sequentially compress the $CO_2$ gas exhausted from the tower. The plurality of heat exchangers is configured so that each part of the $CO_2$ compressed by the plurality of compressors is introduced to the tower in parallel to exchange heat with the absorbent in the tower.

13 Claims, 3 Drawing Sheets

(56) References Cited

FOREIGN PATENT DOCUMENTS

| | | |
|---|---|---|
| JP | 2000-246001 A | 9/2000 |
| JP | 2000-262849 A | 9/2000 |
| JP | 2001-29701 A | 2/2001 |
| JP | 2001-29702 A | 2/2001 |
| JP | 2001-46803 A | 2/2001 |
| JP | 2001-79339 A | 3/2001 |
| JP | 2001-137605 A | 5/2001 |
| JP | 2001-137606 A | 5/2001 |
| JP | 2002-371287 A | 12/2002 |
| JP | 2003-103139 A | 4/2003 |
| JP | 2004-237241 A | 8/2004 |
| JP | 2008-62165 A | 3/2008 |
| JP | 2010-88982 A | 4/2010 |
| JP | 2010-202426 A | 9/2010 |
| JP | 2011-213494 A | 10/2011 |
| JP | 2012-538 A | 1/2012 |
| WO | 2004/080573 A1 | 9/2004 |
| WO | 2010/113364 A1 | 10/2010 |
| WO | WO 2011073671 A1 * | 6/2011 |

* cited by examiner

CARBON DIOXIDE RECOVERY APPARATUS AND METHOD

BACKGROUND OF THE INVENTION

The present invention relates to an apparatus configured to recover carbon dioxide ($CO_2$) and a method for recovering $CO_2$.

The greenhouse effect due to $CO_2$ has been regarded as one of the causes of global warming. In order to suppress this phenomenon, much research and development to prevent or suppress the release of $CO_2$ into the atmosphere have been carried out. Because $CO_2$ is generated mainly by the combustion of fossil fuels, it is desired that exhaust gas generated by the combustion of fossil fuels be emitted to the atmosphere after $CO_2$ contained in the gas is appropriately reduced or removed therefrom.

Japanese Patent Application Publication No. 2008-62165 discloses an apparatus, which is installed in power generation facilities of a thermal power plant, which uses a large amount of fossil fuel, and which is configured to remove and recover $CO_2$ contained in exhaust gas by bringing exhaust gas from a boiler into contact with a $CO_2$ absorbent, and which is configured to store the recovered $CO_2$ without discharging the same into the atmosphere. Japanese Patent Application Publication No. 2008-62165 discloses a regeneration tower configured to separate and remove $CO_2$ gas by applying heat to an absorbent that has absorbed $CO_2$ and is configured to regenerate the absorbent. In addition, Japanese Patent Application Laid-Open No. 2008-62165 discusses a method for compressing the $CO_2$ removed in the regeneration tower by using a plurality of compressors to a state in which the compressed $CO_2$ can be injected into the ground or into an oilfield to be stored therein. Furthermore, Japanese Patent Application Publication No. 2008-62165 discloses a method for improving the energy efficiency of the entire $CO_2$ recovery apparatus by exchanging heat between a part of the absorbent regenerated by the regeneration tower and compression heat generated by a plurality of compressors, by supplying the absorbent heated as described above to a tower bottom portion of the regeneration tower, and by using the heated absorbent supplied to the regeneration tower as a heat source for heating the absorbent.

SUMMARY OF THE INVENTION

The present invention is directed to provide a $CO_2$ recovery apparatus and a $CO_2$ recovery method capable of improving energy efficiency compared with a case of using a conventional method for extracting a part of a regenerated absorbent from a regeneration tower and supplying the absorbent heated with compression heat applied by a compressor to a tower bottom portion of the regeneration tower.

According to an aspect of the present invention, there is provided an apparatus for separating and recovering $CO_2$ from a $CO_2$ absorbent that has absorbed $CO_2$, the apparatus including: a regeneration tower for regenerating the $CO_2$ absorbent that has absorbed $CO_2$ by heating it to separate and remove $CO_2$ therefrom and to exhaust $CO_2$ gas; a compressor for compressing the $CO_2$ gas exhausted from the regeneration tower; and a heat exchanger for heating the $CO_2$ absorbent in the regeneration tower by executing heat exchange with a part of the compressed $CO_2$ by the compressor which is introduced into the regeneration tower.

The apparatus may include a plurality of the compressors and a plurality of the heat exchangers. The plurality of compressors may be arranged in series to sequentially compress the $CO_2$ gas exhausted from the regeneration tower. The plurality of heat exchangers may be configured so that each part of the $CO_2$ compressed by the plurality of compressors is introduced to the regeneration tower in parallel to exchange heat with the $CO_2$ absorbent in the regeneration tower.

The compressed $CO_2$ from one of the plurality of compressors may be used by one of the plurality of heat exchangers. The used compressed $CO_2$ from the one of the heat exchanger may be compressed by one compressor that is subsequent to the one compressor.

The heat exchanger may be located in the regeneration tower and may have a shape of a gas pipe through which the compressed $CO_2$ flows to exchange heat between the compressed $CO_2$ and the absorbent flowing in an outer periphery of the gas pipe. In a case in which a plurality of heat exchangers is located in the regeneration tower, a plurality of gas pipes as the plurality of heat exchangers may be arranged in parallel to one another to exchange heat between the compressed $CO_2$ flowing therein and the absorbent flowing in outer peripheries thereof.

The regeneration tower may include a $CO_2$ desorption unit in which the absorbent that has absorbed $CO_2$ falls to remove $CO_2$ therefrom and a washing unit for cleaning the $CO_2$ gas removed from the absorbent. In this case, the heat exchanger may be located in the $CO_2$ desorption unit and has a shape of a gas pipe through which the compressed $CO_2$ flows to exchange heat between the compressed $CO_2$ and the absorbent flowing in an outer periphery of the gas pipe.

The apparatus may further include a dehydration device for removing moisture from the compressed $CO_2$, the dehydration device being located between two of the plurality of compressors.

According to another aspect of the present invention, there is provided a method for separating and recovering $CO_2$ from a $CO_2$ absorbent that has absorbed $CO_2$, comprising the steps of: regenerating the $CO_2$ absorbent that has absorbed $CO_2$ by heating it to separate and remove $CO_2$ therefrom; and compressing $CO_2$ gas generated by the regeneration of the absorbent, wherein the step of regenerating the absorbent comprises heating the $CO_2$ absorbent by exchanging heat between the $CO_2$ absorbent and a part of the compressed $CO_2$ acquired by the step of compressing the $CO_2$ gas.

The step of compressing the $CO_2$ gas may include sequentially compressing in two or more stages the $CO_2$ gas generated by the regeneration of the absorbent. The step of regenerating the absorbent may include heating the $CO_2$ absorbent by exchanging heat between the $CO_2$ absorbent and each of the compressed $CO_2$ compressed in the two or more stages separately from one another.

After one of the compressed $CO_2$ compressed in the two or more stages may be used for the heat exchange with the $CO_2$ absorbent and then may be used for the compression in a subsequent stage of the two or more stages.

The method may further include removing moisture from the compressed $CO_2$ between two of the compressions in the two or more stages.

DESCRIPTION OF THE EMBODIMENTS

Hereinafter, an embodiment of a $CO_2$ recovery apparatus and method according the present invention will be described with reference to the attached drawings.

Figure 1:
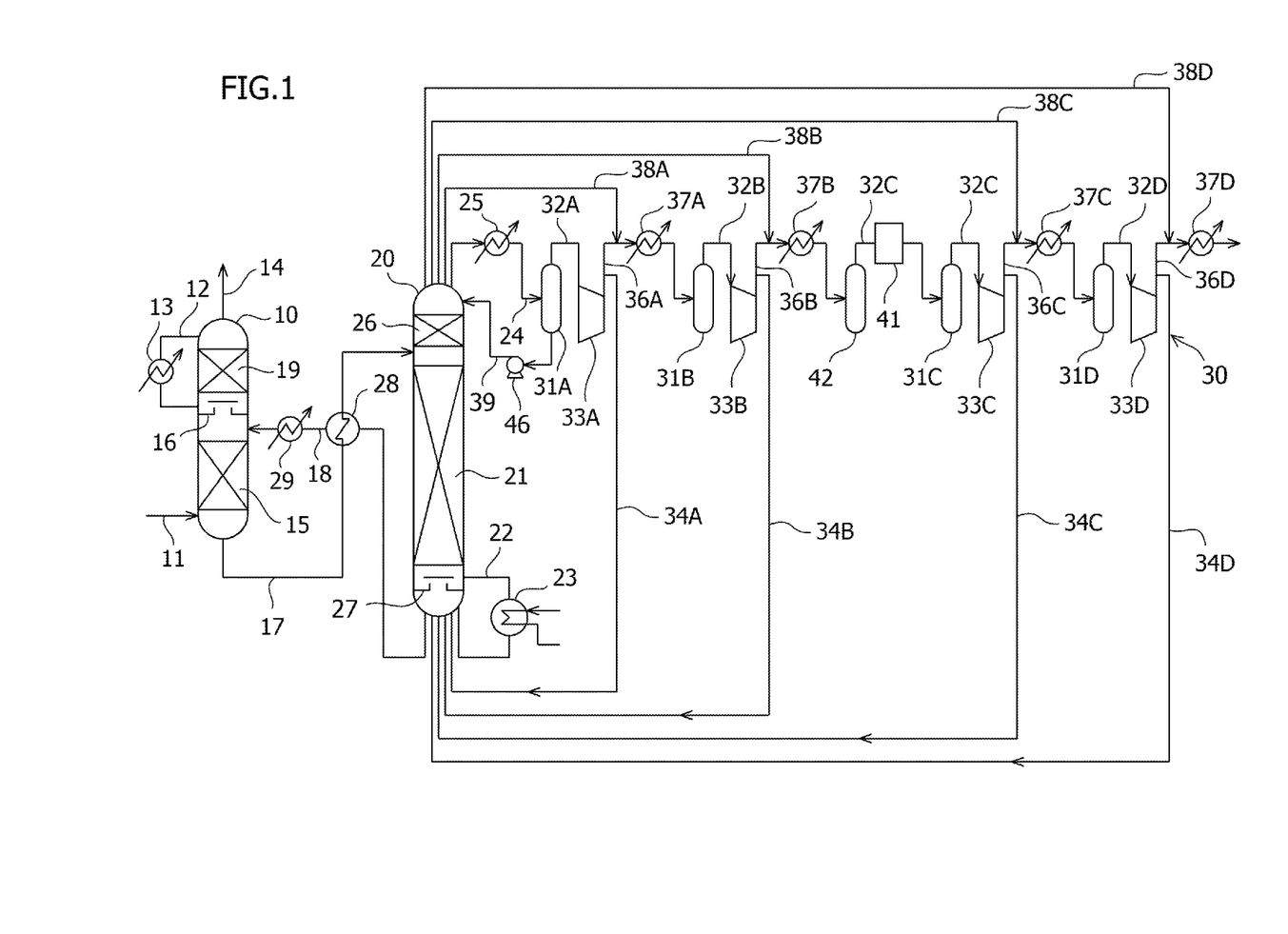
FIG. 1 is a schematic view illustrating an embodiment of a $CO_2$ recovery apparatus according to the present invention.

As shown in FIG. 1, a $CO_2$ recovery apparatus according to the present embodiment includes, as main components thereof, an absorption tower 10, which is configured to remove $CO_2$ from gas to be processed by using a $CO_2$ absorbent, a regeneration tower 20, which is configured to regenerate the $CO_2$ absorbent by desorbing $CO_2$ from the $CO_2$ absorbent which has absorbed $CO_2$ (hereinafter referred to as a "rich absorbent") (the regenerated $CO_2$ absorbent will hereafter be referred to as a "lean absorbent"), and a $CO_2$ gas compression system 30, which is configured to compress $CO_2$ gas generated in the regeneration tower 20. Note that although not illustrated in FIG. 1, the $CO_2$ recovery apparatus according to the present exemplary embodiment can include a desulfurization device provided on the upstream of the absorption tower 10 and which is configured to remove sulfur oxides from gas to be processed, in particular, a high desulfurization cooling tower including a high desulfurization unit and a desulfurized gas cooling unit.

The absorption tower 10 includes a $CO_2$ absorption unit 15 in a lower portion of the absorption tower 10 and a cleaning unit 19 in an upper portion of the absorption tower 10, which are provided across a chimney tray 16 provided in the center portion of the absorption tower 10. In addition, the absorption tower 10 includes a gas introduction line 11, which is provided below the $CO_2$ absorption unit 15 to introduce gas to be processed into the absorption tower 10, a lean absorbent line 18, which is provided below the $CO_2$ absorption unit 15 to supply a $CO_2$ absorbent to the $CO_2$ absorption unit 15, and a rich absorbent line 17, which is provided in the bottom portion of the absorption tower 10 to exhaust the rich absorbent which has absorbed $CO_2$. Furthermore, the absorption tower 10 includes a cleaning fluid circulation line 12, which connects an upper portion of a cleaning unit 19 with a lower portion thereof to circulatively supply the cleaning fluid accumulated on the chimney tray 16 to the cleaning unit 19, a cooler 13, which is provided on the cleaning fluid circulation line 12 to cool the cleaning fluid, and a gas exhaustion line 14, which is provided on the top portion of the absorption tower 10 to exhaust gas that has passed the $CO_2$ absorption unit 15 and the cleaning unit 19 outside the absorption tower 10.

The $CO_2$ absorbent is not limited to a specific type absorbent. However, it is useful to use a $CO_2$ absorbent containing a basic amine compound as a main component thereof. The basic amine compound includes, for example, primary amines containing alcoholic hydroxyl such as monoethanolamine, and 2-amino-2-methyl-1-propanol; secondary amines containing alcoholic hydroxyl such as diethanolamine, 2-methyl aminoethanol, and 2-ethylamino ethanol; tertiary amines containing alcoholic hydroxyl such as triethanolamine, N-methyldiethanolamine, 2-dimethyl aminoethanol, and 2-diethylaminoethanol; polyethylene polyamines such as ethylenediamine, triethylenediamine, and diethylenetriamine; cyclic amines such as piperazines, piperidines, and pyrrolidines; polyamines such as xylylenediamine; and amino acids such as methylamine carboxylic acid. The $CO_2$ absorbent can contain one or a plurality of the compounds described above. The concentration of the basic amine compound can be 10-70% by weight. The $CO_2$ absorbent can contain a $CO_2$ absorption accelerator and a corrosion inhibitor. In addition, the $CO_2$ absorbent can include a medium other than those described above, such as methanol, polyethylene glycol, or sulfolane.

Tap water or industrial water may be used as the cleaning fluid in the cleaning unit 19, but the present invention is not limited thereto.

The regeneration tower 20 includes a $CO_2$ desorption unit 21, which is provided in a portion of the regeneration tower 20 from the center to a lower portion thereof. In addition, the regeneration tower 20 includes a washing unit 26, which is provided above the $CO_2$ desorption unit 21, and a chimney tray 27, which is provided below the $CO_2$ desorption unit 21. In the regeneration tower 20, the rich absorbent line 17 for introducing the rich absorbent that has absorbed $CO_2$ in the absorption tower 10 into the regeneration tower 20 is provided between the $CO_2$ desorption unit 21 and the washing unit 26. In addition, in the regeneration tower 20, the lean absorbent line 18 for supplying the regeneration-processed lean absorbent to the absorption tower 10 is provided in the bottom portion of the regeneration tower 20. Furthermore, in the regeneration tower 20, a heat exchanger 28, which exchanges heat between the rich absorbent line 17 and the lean absorbent line 18, is provided. In addition, a heat exchanger 29, which further recovers heat from the lean absorbent, is provided between the heat exchanger 28 and the absorption tower 10.

The regeneration tower 20 includes an absorbent regeneration line 22 for extracting a part of the lean absorbent from the bottom portion of the regeneration tower 20 and for supplying the extracted lean absorbent to the chimney tray 27 from above. The absorbent regeneration line 22 includes a reboiler 23, which the reboiler 23 heats the lean absorbent. The reboiler 23 being different from the heat exchanger for heating the $CO_2$ absorbent in the regeneration tower by executing heat exchange with a part of the $CO_2$ compressed by the compressor. In addition, the regeneration tower 20 includes a $CO_2$ gas exhaustion line 24 for exhausting $CO_2$ gas which has been desorbed from the lean absorbent from the top portion of the regeneration tower 20. The $CO_2$ gas exhaustion line 24 includes a condenser 25 which condenses steam entrained in the $CO_2$ gas and a separator drum 31A which separates condensed water, which results from the condensation by the condenser 25, from the gas. The condenser 25 can use cooling water to cool the gas. A condensed water return line 39, which is a line for supplying the separated condensed water as washing water for the washing unit 26 of the regeneration tower 20, is provided to the separator drum 31A. A pump 46 for feeding the condensed water to the regeneration tower 20 is provided to the condensed water return line 39. Note that an inner configuration of the regeneration tower 20, particularly the $CO_2$ desorption unit 21, will be described in detail later below.

The $CO_2$ gas compression system 30 includes a plurality of compressors 33 as a main component thereof. The plurality of compressors 33 is serially provided and is configured to compress the $CO_2$ gas exhausted from the regeneration tower 20. In FIG. 1, four compressors 33A through 33D are illustrated. However, in the present exemplary embodiment, the number of the compressors 33 is not limited to four. More specifically, the compressors 33 can be provided in the appropriate number with which $CO_2$ gas can be serially compressed in raising the pressure applied to the compressed $CO_2$ gas to a predetermined pressure level (for example, a critical point of 7.4 MPa). For example, if compressed $CO_2$ gas is to be injected from the ground of an oilfield and reserved therein, it is useful if the number of the compressors 33 to be provided is three. It is more useful, in this case, if the number of the compressors 33 to be provided is four or more. More specifically, it is useful if the number of the compressors 33 is eight or less.

To each of the compressors 33, a separator drum 31 which separates the condensed water from the $CO_2$ gas, a gas line 32 for feeding the $CO_2$ gas from which condensed water has been separated to the compressor 33, a compressed $CO_2$ gas-heat utilizing line 34 for feeding a part of the compressed $CO_2$ gas compressed by the compressor 33, a compressed $CO_2$ gas compression line 36 for supplying a part of the $CO_2$ gas compressed by the compressor 33 to a subsequent compressor, and a compressor 37 which condenses steam entrained in the compressed $CO_2$ gas are provided. In addition, a compressed $CO_2$ gas recovery line 38 for returning the compressed $CO_2$ gas fed to the regeneration tower 20 to the compressed $CO_2$ gas compression line 36 is provided before the condenser 37 of the compressed $CO_2$ gas compression line 36. Although not illustrated in FIG. 1, a condensed water return line for returning the condensed water to the regeneration tower 20 is provided to each of the second-stage through the fourth-stage separator drums 31 (i.e., separator drums 31B through 31D) as is provided to the separator drum 31A.

The $CO_2$ gas compression system 30 further includes a dehydration device 41, which is capable of removing moisture from the compressed $CO_2$ gas by an amount larger than a saturating amount. The dehydration device 41 is not limited to a particular type device and any dehydration device capable of reducing the humidity of gas can be used. For example, it is useful if a dehydration device of a type that uses a glycol absorbent is used. For the absorbent described above, monoethylene glycol, diethylene glycol, or triethylene glycol, for example, can be used. A separator drum 42 can be provided upstream of the dehydration device 41. The dehydration device 41 can perform at a sufficiently high level by previously removing the moisture from the gas as large an amount as the saturating amount by using the separator drum 42. Note that it is useful if the dehydration device 41 is provided and positioned in the center of the location where the plurality of compressors 33 is provided. For example, in the example illustrated in FIG. 1, the dehydration device 41 is provided between the second-stage compressor 33B and the third-stage compressor 33C. However, the present invention is not limited to this.

Figure 2:
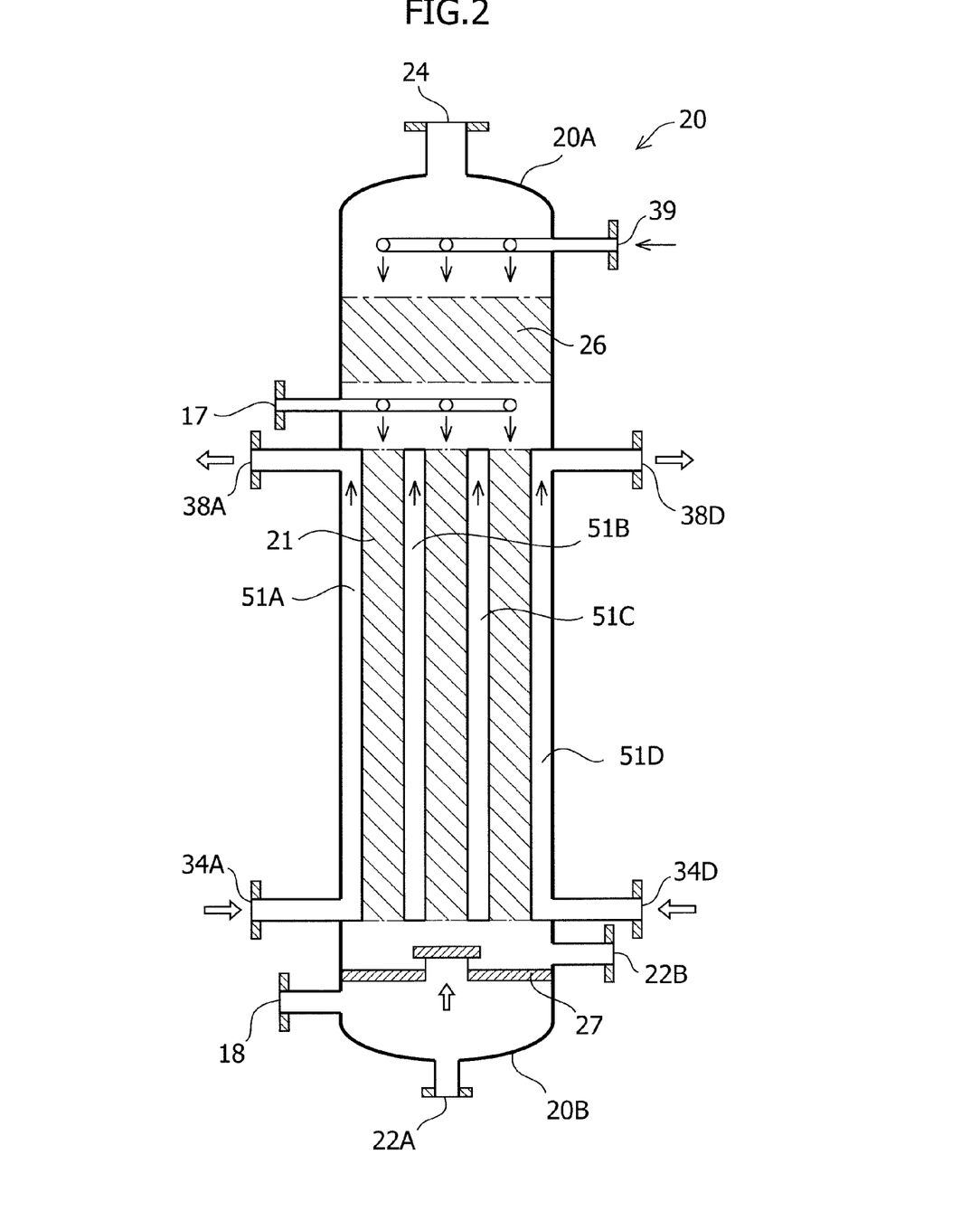
FIG. 2 is a cross-sectional view schematically showing an example of a regeneration tower illustrated in FIG. 1.

Referring to FIG. 2, to the $CO_2$ desorption unit 21 of the regeneration tower 20, a plurality of gas pipes 51, through which the compressed $CO_2$ gas compressed by the plurality of compressors 33 of the $CO_2$ gas compression system 30 is fed, is provided in a manner extending from a tower bottom 20B towards a tower top 20A in parallel to one another. The $CO_2$ desorption unit 21 provided in the outer periphery of the gas pipe 51 is a portion onto which the rich absorbent diffused from the rich absorbent line 17 via a plurality of nozzles falls. More specifically, the $CO_2$ desorption unit 21 is configured to heat, via the gas pipe 51, the rich absorbent outside the gas pipe 51 by using the compressed $CO_2$ gas flowing through the gas pipe 51.

Gas pipes 51A through 51D are connected to compressed $CO_2$ gas heat utilizing lines 34A through 34D, which are extended from compressors 33A through 33D, respectively. With this configuration, portions of the compressed $CO_2$ gas, which have been compressed by different compressors, may not be mixed together or introduced into one gas pipe. In addition, the compressed $CO_2$ gas heat utilizing lines 34A through 34D are connected to compressed $CO_2$ gas recovery lines 38A through 38D respectively via the gas pipes 51A through 51D. Note that in the example illustrated in FIG. 2, four gas pipes 51A through 51D are provided to the $CO_2$ desorption unit 21. However, this is a simplified illustration presented merely for easier understanding. More specifically, a plurality of gas pipes 51 can be provided for each compressed $CO_2$ gas to be compressed by each compressor. It is useful if the total number of the gas pipes 51 is in the range of several tens to several hundreds.

The outer periphery portion of the gas pipe 51 of the $CO_2$ desorption unit 21 can be filled with a filling (not illustrated). With this configuration, the desorption of the $CO_2$ gas from the rich absorbent can be accelerated. In addition, a fin (not illustrated) can be provided on an outer wall of the gas pipe 51. With this configuration, the heat exchange between the gas flowing inside the pipe and the absorbent flowing outside the pipe can be accelerated.

With the above-described configuration, as illustrated in FIG. 1, at the start of processing, gas to be processed containing $CO_2$ is introduced to the absorption tower 10 via the gas introduction line 11. In addition, $CO_2$ absorbent is supplied to the absorption tower 10 via the lean absorbent line 18. In the $CO_2$ absorption unit 15, the gas to be processed and the $CO_2$ absorbent are brought into gas-liquid contact with each other to allow the $CO_2$ absorbent to absorb $CO_2$ contained in the gas to be processed to remove $CO_2$ therefrom. The gas, from which $CO_2$ has been removed, flows above the chimney tray 16 to reach the cleaning unit 19, which is provided in the upper portion of the absorption tower 10. The gas is then cleaned by using the cleaning fluid. Subsequently, the cleaned gas is exhausted from the gas exhaustion line 14, which is provided in the top portion of the absorption tower 10. The cleaning fluid used by the cleaning unit 19 is accumulated on the chimney tray 16 and does not fall into the $CO_2$ absorption unit 15. The cleaning fluid accumulated on the chimney tray 16 is fed to the cooler 13 via the cleaning fluid circulation line 12 to be cooled by the cooler 13. After that, the cooled cleaning fluid is reused by the cleaning unit 19 as the cleaning fluid.

The rich absorbent, which has absorbed $CO_2$ in the absorption tower 10, is exhausted from the bottom portion of the absorption tower 10 via the rich absorbent line 17. Subsequently, the exhausted rich absorbent is heated by the heat exchanger 28 to be fed to the regeneration tower 20. As illustrated in FIG. 2, in the regeneration tower 20, the rich absorbent is diffused onto the $CO_2$ desorption unit 21 from the plurality of nozzles provided on a tip of the rich absorbent line 17. The rich absorbent falls while being heated by the plurality of gas pipes 51 provided to the $CO_2$ desorption unit 21. Because a high-temperature compressed $CO_2$ gas flows from the tower bottom 20B towards the tower top 20A inside the gas pipe 51, the rich absorbent is exposed to a higher temperature as the rich absorbent falls more downwards along the $CO_2$ desorption unit 21. Subsequently, the rich absorbent falls to reach the chimney tray 27, which is provided in the vicinity of the tower bottom 20B after discharging most of the $CO_2$.

The absorbent accumulated onto the chimney tray 27 is fed from an inlet 22B of the absorbent regeneration line 22 to be heated by the reboiler 23 with steam. Subsequently, residual $CO_2$ is discharged from the absorbent to regenerate the absorbent. Then the regenerated absorbent is returned to the tower bottom 20B of the regeneration tower 20 from an outlet 22A of the absorbent regeneration line 22. The regenerated lean absorbent is fed to the heat exchanger 28 from the tower bottom 20B via the lean absorbent line 18. The heat exchanger 28 heats the rich absorbent. Subsequently, the heat exchanger 29 further recovers the heat from the absorbent. Then the absorbent is supplied to the absorption tower 10.

The $CO_2$ gas desorbed from the rich absorbent is fed through the chimney tray 27 and the $CO_2$ desorption unit 21 and is raised up to the washing unit 26. In the washing unit 26, the washing water is diffused from a plurality of nozzles provided on a tip of the condensed water return line 39 to remove the entrained absorbent from the $CO_2$ gas. After being washed by the washing unit 26, $CO_2$ gas is exhausted from the $CO_2$ gas exhaustion line 24, which is provided on a tower top 20A of the regeneration tower 20.

In the $CO_2$ gas exhaustion line 24, steam entrained in the $CO_2$ gas is initially condensed by the condenser 25. Furthermore, the condensed water is separated by the separator drum 31A. After being separated, the condensed water is returned to the regeneration tower 20 via the condensed water return line 39. After the condensed water is removed from the $CO_2$ gas, the $CO_2$ gas is introduced into the first-stage compressor 33A via a $CO_2$ gas line 32A. In the compressor 33A, the temperature of the $CO_2$ gas is raised to a high level when the $CO_2$ gas is compressed to a predetermined pressure. After the $CO_2$ gas is compressed by the compressor 33A, a part of the compressed $CO_2$ gas is fed to the regeneration tower 20 via the compressed $CO_2$ gas heat utilizing line 34A to utilize the same as a heat source for heating the absorbent. On the other hand, the other portion of the compressed $CO_2$ gas is fed to the second-stage compressor 33B via the compressed $CO_2$ gas compression line 36A to be further compressed. In addition, the compressed $CO_2$ gas that has heated the absorbent in the regeneration tower 20 is recovered via the compressed $CO_2$ gas recovery line 38A. Then, the recovered compressed $CO_2$ gas is mixed with compressed $CO_2$ gas upstream of the condenser 37A of the compressed $CO_2$ gas compression line 36A.

In the compressed $CO_2$ gas compression line 36A, similar to the processing by the first-stage compressor 33A, the steam entrained in the compressed $CO_2$ gas is condensed by a condenser 37A. Then, the condensed water is separated by the separator drum 31B. Subsequently, the $CO_2$ gas is introduced into the second-stage compressor 33B via a $CO_2$ gas line 32B. The second-stage compressor 33B compresses the $CO_2$ gas to a predetermined pressure and the temperature of the gas is raised. Subsequently, a part of the further-compressed $CO_2$ gas is fed to the regeneration tower 20 via the compressed $CO_2$ gas utilizing line 34B to be utilized as a heat source for heating the absorbent. The other part of the compressed $CO_2$ gas and the compressed $CO_2$ gas that has heated the absorbent in the regeneration tower 20 are fed to the third-stage compressor 33C via the compressed $CO_2$ gas compression line 36B and the compressed $CO_2$ gas recovery line 38B to be further compressed thereby.

Note that before the compressed $CO_2$ gas is compressed by the third-stage compressor 33C, entraining steam is condensed and removed by a condenser 37B and the separator (dehydration) drum 42 before the compressed $CO_2$ gas is introduced to the dehydration device 41. In the dehydration device 41, the moisture in the compressed $CO_2$ gas can be absorbed by the absorbent to be removed therefrom by bringing the compressed $CO_2$ gas into gas-liquid contact with a glycol absorbent. After the compressed $CO_2$ gas is dehydrated by the dehydration device 41, the entraining moisture and glycol are condensed and separated by the separator drum 31C. Subsequently, the compressed $CO_2$ gas is introduced into the high-pressure side compressor 33C. In the third-stage compressor 33C, the compressed $CO_2$ gas is compressed with a pressure as high as a predetermined pressure and the temperature of the gas is raised. Subsequently, a part of the compressed $CO_2$ gas is fed to the regeneration tower 20 via the compressed $CO_2$ gas utilizing line 34C to utilize the fed part of the compressed $CO_2$ gas as the heat source for heating the absorbent. In addition, the other portion of the compressed $CO_2$ gas and the compressed $CO_2$ gas used by the regeneration tower 20 as the heat source are fed to the fourth-stage compressor 33D via the compressed $CO_2$ gas compression line 36C and the compressed $CO_2$ gas recovery line 38C.

In the fourth-stage compressor 33D, in the manner similar to the processing described above, after moisture and glycol are condensed and removed from the compressed $CO_2$ gas, the compressed $CO_2$ gas is further compressed with a pressure as high as a final predetermined pressure and the compressed $CO_2$ is utilized as the heat source for heating the absorbent in the regeneration tower 20. The compressed $CO_2$ compressed with the final predetermined pressure is recovered to be used for a predetermined purpose.

By compressing the $CO_2$ gas exhausted from the regeneration tower 20 by a plurality of stages by using the plurality of compressors 33 until the pressure reaches the final predetermined pressure and by utilizing the compressed $CO_2$ gas compressed by each compressor 33 or a part of the compressed $CO_2$ as the heat source for heating the absorbent in the regeneration tower 20, a part of the energy consumed in compressing the $CO_2$ gas by using the compressor 33 can be used in heating the absorbent in the regeneration tower 20. Therefore, the amount of steam necessary for heating and regenerating the absorbent in the regeneration tower 20 can be reduced. Accordingly, the total amount of the energy consumed by the entire $CO_2$ recovery apparatus can be reduced.

Furthermore, because the temperature of the compressed $CO_2$ gas utilized as the heat source for heating the absorbent in the regeneration tower 20 or the compressed $CO_2$ is decreased, the amount of cooling water necessary for the cooling by the condenser 37 can be reduced by mixing, in a portion upstream of the condenser 37, the utilized compressed $CO_2$ gas or the utilized compressed $CO_2$ with compressed $CO_2$ gas or compressed $CO_2$ yet to be utilized as the heat source. In addition, in some cases in which the cooling by the condenser 37 is unnecessary, the cooling by the condenser 37 can be omitted.

Now, shutdown of the $CO_2$ recovery apparatus according to the present exemplary embodiment will be described. In shutting down the absorption tower 10 and the regeneration tower 20, at the start of the shutdown operation, the $CO_2$ gas compression system 30 is shut down and the reboiler 23 of the regeneration tower 20 is shut down. In the shutdown operation described above, a switching valve (not illustrated) is switched so that the $CO_2$ gas from the $CO_2$ gas exhaustion line 24 provided on the tower top 20A of the regeneration tower 20 is exhausted outside the system. At the same time, the compressed air within the plant is supplied to the $CO_2$ gas line 32A.

By executing the operation described above, non-compressed $CO_2$ gas is fed through the gas pipe 51 of the regeneration tower 20. Because the compressed air acts as a coolant due to its low temperature ranging from 20 to 40° C., the inside of the regeneration tower 20, whose temperature has been raised to a high level by 23, can be cooled more rapidly than the time taken in the case of a conventional method. Accordingly, the time taken in shutting down the $CO_2$ recovery apparatus can be shortened. At the same time, because the inside of the compressor 33 can be substituted with the dry compressed air, the moisture within the compressor 33 can be removed. As a result, corrosion of the compressor 33 can be prevented.

Figure 3:
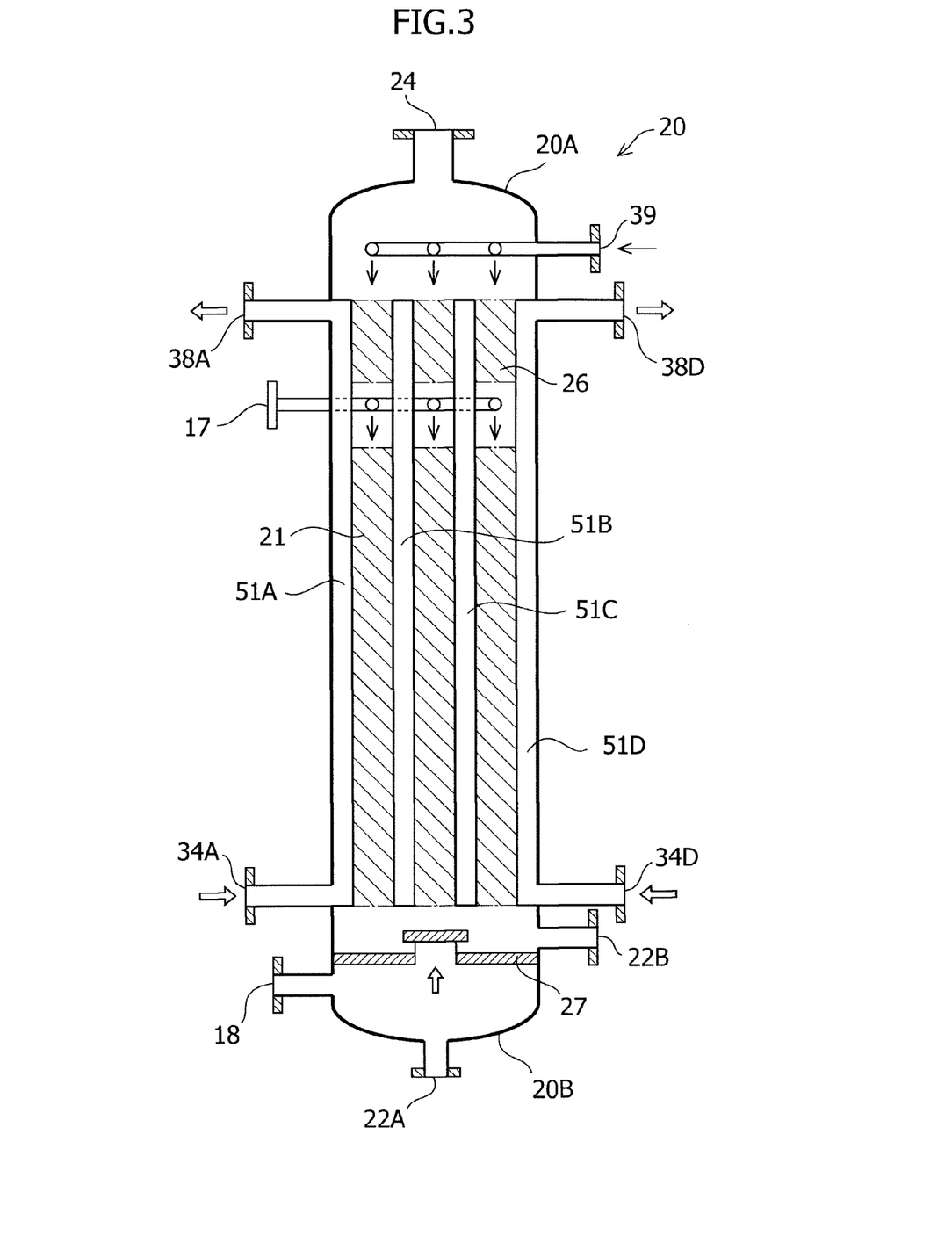
FIG. 3 is a cross-sectional view schematically showing another example of the regeneration tower illustrated in FIG. 1.

The heating of the $CO_2$ desorption unit 21 of the regeneration tower 20 by using the compressed $CO_2$ gas or the compressed $CO_2$ compressed by the compressor 33 is as described above with reference to FIG. 2. However, as illustrated in FIG. 3, the entire regeneration tower 20 including the $CO_2$ desorption unit 21 and the washing unit 26 can be heated with the compressed $CO_2$ gas or the compressed $CO_2$. To paraphrase this, the entire regeneration tower 20 can be heated as described above because the plurality of the gas pipes 51 is provided in a manner extending from the tower bottom portion, in which the $CO_2$ desorption unit 21 is provided, towards the tower top portion, in which the washing unit 26 is provided, in parallel to one another.

Although not illustrated in the drawings, a high desulfurization cooling tower configured to remove sulfur oxides contained in gas to be processed, which can be provided upstream of the gas to be processed by the absorption tower 10, will now be described below. The high desulfurization cooling tower includes a high desulfurization unit, which is provided in a lower portion of the high desulfurization cooling tower and configured to remove to a high degree a sulfur oxides contained in gas to be processed. In addition, the high desulfurization cooling tower includes a desulfurized gas cooling unit, which is provided in an upper portion of the high desulfurization cooling tower and configured to cool the desulfurized gas that has passed the high desulfurization unit down to 50° C., for example. The gas that has passed the desulfurized gas cooling unit is then introduced into the absorption tower 10. Exhaust gas usually contains sulfur oxides and carbon dioxide. The high desulfurization unit executes high desulfurization processing to reduce the concentration of the sulfur oxides down to 5 ppm or lower (it is more useful if the concentration of the sulfur oxides is reduced to 1 ppm or lower) by absorbing and removing sulfur oxides contained in exhaust gas by bringing the exhaust gas into contact with a basic absorbent. If the concentration of sulfur oxides contained in the gas exceeds 5 ppm, the sulfur oxides may be accumulated into the $CO_2$ absorbent used in the absorption tower. In this case, a problem of the increased frequency of reclaiming the $CO_2$ absorbent may arise. To prevent the above-described problem, the high desulfurization unit executes the high desulfurization processing.

For the basic absorbent, an absorbent that contains one basic compound or a mixture of two or more compounds of calcium carbonate, calcium hydroxide, magnesium hydroxide, sodium hydroxide, and the like can be used, for example. It is useful, for example, if the concentration of the basic compound is 0.1 to 30% by weight.

The desulfurized gas cooling unit cools the gas processed by the high desulfurization unit down to 50° C. or lower, more usefully to 45° C. or lower, and yet more usefully to a range of 30-45° C. The desulfurized gas cooling unit cools the highly desulfurization-processed gas because otherwise a problem of wasteful consumption of the basic amine compound may arise due to an increase, in the absorption tower 10 which is a tower subsequent to the high desulfurization cooling tower, of the amount of the basic amine compound, which is the main component of the $CO_2$ absorbent entrained in the gas. As described above, by installing the high desulfurization cooling tower upstream of the gas to be processed by the absorption tower 10 of the present invention, the absorption tower 10 can easily remove and recover $CO_2$ contained in the gas at low costs.

EXAMPLE

The inventor of the present invention carried out a simulation for a ratio of reduction of the amount of steam consumed by the reboiler between a case in which the absorbent is heated with the compressed $CO_2$ gas or the compressed $CO_2$ by using the $CO_2$ desorption unit of the regeneration tower illustrated in FIG. 2 and a case in which the absorbent is heated with the compressed $CO_2$ gas or the compressed $CO_2$ by using the entire regeneration tower illustrated in FIG. 3, compared with a comparative example that does not execute the heating with the compressed $CO_2$ gas or the compressed $CO_2$. For conditions of the simulation, the number of the stages of the compressor was set at four. In addition, at the respective stages, the levels of compressing the $CO_2$ were set at 0.5 MPa, 1.9 MPa, 5.5 MPa, and 10 MPa. The ratios of the compressed $CO_2$ gas or the compressed $CO_2$ supplied to the regeneration tower by the respective compressors were uniformly set at 100% on the flow rate basis.

As a result of the simulation, the inventor found that in executing the heat exchange by using the $CO_2$ desorption unit illustrated in FIG. 2 only, the amount of the steam consumed by the reboiler was reduced by a ratio as high as 8.1% in comparison with the comparative example. In addition, the inventor found that in executing the heat exchange by using the entire regeneration tower illustrated in FIG. 3, the amount of the steam consumed by the reboiler was reduced by a ratio as high as 7.5% in comparison with the comparative example.

Whereas the present invention has been described in connection with preferred embodiments, it is not intended to limit the scope of the present invention to a specific embodiment described above. In addition, it is intended that various modifications, alterations, or equivalents can implement the present invention without any deviation from the spirit and the scope of the present invention as defined by the appended claims.

What is claimed is:

1. An apparatus for separating and recovering $CO_2$ from a $CO_2$ absorbent that has absorbed $CO_2$, comprising:
    a regeneration tower for regenerating the $CO_2$ absorbent that has absorbed $CO_2$ by heating it to separate and remove $CO_2$ therefrom and to exhaust $CO_2$ gas;
    a compressor for compressing the $CO_2$ gas exhausted from the regeneration tower to yield compressed $CO_2$;
    a heat exchanger for heating the $CO_2$ absorbent in the regeneration tower by executing heat exchange with a part of the compressed $CO_2$ introduced into the regeneration tower; and
    a reboiler for heating a part of the $CO_2$ absorbent extracted from a bottom portion of the regeneration tower, the reboiler being different from the heat exchanger,
    wherein the heat exchanger is located in the regeneration tower and has a shape of a gas pipe through which the compressed $CO_2$ flows to exchange heat between the compressed $CO_2$ and the absorbent flowing in an outer periphery of the gas pipe.

2. The apparatus according to claim 1, comprising a plurality of the compressors and a plurality of the heat exchangers,
    wherein the plurality of compressors is arranged in series to sequentially compress the $CO_2$ gas exhausted from the regeneration tower, and wherein the plurality of heat exchangers is configured so that each part of the $CO_2$ compressed by the plurality of compressors is introduced to the regeneration tower in parallel to exchange heat with the $CO_2$ absorbent in the regeneration tower.

3. The apparatus according to claim 2, wherein the compressed $CO_2$ from one of the plurality of compressors is used by one of the plurality of heat exchangers, and wherein the used compressed $CO_2$ from the one of the plurality of heat exchangers is compressed by one compressor that is subsequent to the one of the plurality of compressors.

4. The apparatus according to claim 2, wherein the plurality of heat exchangers are located in the regeneration tower and each has a shape of a gas pipe through which the compressed $CO_2$ flows to exchange heat between the compressed $CO_2$ and the absorbent flowing in outer peripheries of the gas pipes, and wherein the plurality of gas pipes are arranged in parallel to one another.

5. The apparatus according to claim 1, wherein the regeneration tower comprises a $CO_2$ desorption unit in which the absorbent that has absorbed $CO_2$ falls to remove $CO_2$ therefrom and a washing unit for cleaning the $CO^2$ gas removed from the absorbent.

6. The apparatus according to claim 5, wherein the heat exchanger is located in the $CO_2$ desorption unit and has a shape of a gas pipe through which the compressed $CO_2$ flows to exchange heat between the compressed $CO_2$ and the absorbent flowing in an outer periphery of the gas pipe.

7. The apparatus according to claim 1, further comprising a dehydration device for removing moisture from the compressed $CO_2$, the dehydration device being located between two of a plurality of compressors.

8. The apparatus according to claim 7, wherein the dehydration device removes moisture from the compressed $CO_2$ by using a glycol absorbent.

9. A method for separating and recovering $CO_2$ from a $CO_2$ absorbent that has absorbed $CO_2$, comprising the steps of:
   regenerating the $CO_2$ absorbent that has absorbed $CO_2$ by heating it using a regeneration tower to separate and remove $CO_2$ therefrom; and
   compressing $CO_2$ gas generated by the regeneration of the absorbent to yield compressed $CO_2$,
   wherein the step of regenerating the absorbent further comprises:
   extracting a part of the $CO_2$ absorbent from a bottom portion of the regeneration tower, heating the part of the $CO_2$ absorbent by a reboiler, and returning the heated $CO_2$ absorbent to the bottom portion of the regeneration tower; and
   introducing a part of the compressed $CO_2$ into the regeneration tower and heating the $CO_2$ absorbent in the regeneration tower by exchanging heat between the $CO_2$ absorbent and the part of the compressed $CO_2$.

10. The method according to claim 9, wherein the step of compressing the $CO_2$ gas comprises sequentially compressing in two or more stages the $CO_2$ gas generated by the regeneration of the absorbent, and
   wherein the step of regenerating the absorbent comprises heating the $CO_2$ absorbent by exchanging heat between the $CO_2$ absorbent and each of the compressed $CO_2$ compressed in the two or more stages separately from one another.

11. The method according to claim 10, wherein after one of the compressed $CO_2$ compressed in the two or more stages is used for the heat exchange with the $CO_2$ absorbent, the heat exchanged compressed $CO_2$ compressed in the two or more stages is used for the compression in a subsequent stage of the two or more stages.

12. The method according to claim 9, further comprising removing moisture from the compressed $CO_2$ between two of the compressions in the two or more stages.

13. The method according to claim 12, wherein the step of removing moisture comprises dehydrating the compressed $CO_2$ by using a glycol absorbent.

* * * * *